(12) United States Patent
Nakaya et al.

(10) Patent No.: US 8,912,287 B2
(45) Date of Patent: Dec. 16, 2014

(54) METHOD FOR PRODUCING POLYMER USING MONOMER HAVING PIPERIDINE SKELETON, AND MOLDED BODY

(75) Inventors: Fuminori Nakaya, Otake (JP); Tetsuya Noda, Otake (JP); Keiichi Sakashita, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 128 days.

(21) Appl. No.: 13/513,332

(22) PCT Filed: Dec. 1, 2010

(86) PCT No.: PCT/JP2010/071430
§ 371 (c)(1),
(2), (4) Date: Jun. 1, 2012

(87) PCT Pub. No.: WO2011/068110
PCT Pub. Date: Jun. 9, 2011

(65) Prior Publication Data
US 2012/0245318 A1 Sep. 27, 2012

(30) Foreign Application Priority Data
Dec. 1, 2009 (JP) .................. 2009-273576
Jan. 7, 2010 (JP) .................. 2010-001742

(51) Int. Cl.
*C08F 226/06* (2006.01)
*C08F 220/14* (2006.01)
*C08F 220/34* (2006.01)

(52) U.S. Cl.
CPC ......... *C08F 220/14* (2013.01); *C08F 2220/346* (2013.01)
USPC ........... 525/279; 525/191; 525/194; 525/224; 525/229; 525/230; 525/233; 526/263; 526/319

(58) Field of Classification Search
USPC .......... 526/263, 319; 525/191, 194, 224, 229, 525/20, 233, 279
See application file for complete search history.

(56) References Cited

U.S. PATENT DOCUMENTS

| | | | |
|---|---|---|---|
| 4,983,737 A | * | 1/1991 | Ravichandran et al. ...... 546/184 |
| 5,700,894 A | * | 12/1997 | Krieg et al. ................ 526/323.2 |
| 2007/0232768 A1 | | 10/2007 | Nesvadba et al. |
| 2009/0104447 A1 | * | 4/2009 | Kita et al. ..................... 428/412 |
| 2009/0131571 A1 | * | 5/2009 | Fraser et al. .................. 524/431 |
| 2010/0056675 A1 | | 3/2010 | Kiura et al. |

FOREIGN PATENT DOCUMENTS

| | | |
|---|---|---|
| EP | 2 088 172 A1 | 8/2009 |
| JP | 2003040937 A * | 2/2003 |
| JP | 2008 500307 | 1/2008 |
| JP | 2008 127527 | 6/2008 |
| JP | 2008 231307 | 10/2008 |

OTHER PUBLICATIONS

JP 2003040937 A, Feb. 2003, Derwent Ab.*
Extended European Search Report issued Apr. 15, 2013, in European Patent Application No. 10834560.4.
International Search Report Issued Jan. 11, 2011 in PCT/JP10/71430 Filed Dec. 1, 2010.
U.S. Appl. No. 14/123,147, filed Nov. 29, 2013, Noda, et al.
U.S. Appl. No. 14/123,158, filed Nov. 29, 2013, Nakaya, et al.

* cited by examiner

*Primary Examiner* — Satya Sastri
(74) *Attorney, Agent, or Firm* — Oblon, Spivak, McClelland, Maier & Neustadt, L.L.P.

(57) ABSTRACT

Disclosed are a method for producing a polymer by a polymerization of a mixture at a temperature of 210° C. or lower, wherein the mixture comprises 0.01 to 35 mol % of a monomer or a polymer thereof which has a piperidine skeleton represented by formula (1), and a molded body thereof.

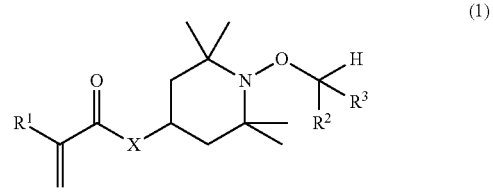

(1)

$R^1$ represents a hydrogen atom or a methyl group, X represents an oxygen atom, an imino group, or a specific oxygen atom containing a hydrocarbon group, and $R^2$ and $R^3$ represent a hydrogen atom, a linear alkyl group with C1 to C8, a branched alkyl group with C1 to C8, an alicyclic hydrocarbon with C6 to C8, or an aryl group, wherein $R^2$ and $R^3$ may also form a cyclic structure.

5 Claims, No Drawings

METHOD FOR PRODUCING POLYMER USING MONOMER HAVING PIPERIDINE SKELETON, AND MOLDED BODY

TECHNICAL FIELD

The present invention relates to a method for producing a polymer by a polymerization of a mixture which comprises a monomer having a piperidine skeleton or a polymer thereof, and a molded body obtained by the method.

BACKGROUND ART

In recent years, from the viewpoint of reduction of the equipment maintenance costs and reduction of environmental load, weathering resistance improvement of the polymer material used under a severe condition such as outdoors is strongly required.

For the purpose of weathering resistance improvement of a polymer material used as a coating material, patent document 1 proposes adding a hindered amine light stabilizer having a piperidine skeleton whose a nitrogen atom is bonded to a various kinds of OR group (hereinafter, referred to as "NOR-HALS"), among hindered amine light stabilizers having a piperidine skeleton (hereinafter, referred to as "HALS"), to coating material components. Although the NOR-HALS has an advantageous effect of weathering resistance improvement of the polymer material, there is a problem that it slowly vanishes from the polymer material by migration or volatilization and the advantageous effect decreases with time.

For the purpose of solving this problem, patent document 2 proposes copolymerizing a polymerizable NOR-HALS (hereinafter, referred to as "polymerizable NOR-HALS") having a vinyl group in a molecule to add it to coating material components.

PRIOR ART DOCUMENT

Patent Document

Patent document 1: JP 01-113368 A
Patent document 2: JP 02-281009 A

SUMMARY OF THE INVENTION

Problem to be Solved by the Invention

Although patent document 2 proposes adding a copolymer of a polymerizable NOR-HALS to coating material components, it does not disclose using a copolymer of a polymerizable NOR-HALS as a molded body. If a copolymer of a polymerizable NOR-HALS is used as a molded body and if weathering resistance of the molded body per se can be improved, it is meaningful from the viewpoint of reduction of the equipment maintenance costs and reduction of environmental load.

As a result of the present inventors' study, in the case of carrying out an extrusion molding or an injection molding of a copolymer of a polymerizable NOR-HALS, the heating at the time of molding processing results in dissociation of R which is connected to nitroxide (—NO—), and coloration of the molded body obtained is confirmed.

It is an object of the present invention to provide a non-colored molded body which has an excellent weathering resistance and in which the advantageous effect does not decrease with time.

Means of Solving the Problems

As a result of the present inventors' earnest study, it is found that a non-colored molded body which has an excellent weathering resistance and in which the advantageous effect does not decrease with time can be obtained by appropriately selecting R which is connected to nitroxide and by carrying out a polymerization at an appropriate temperature range.

That is, the present invention is a method for producing a polymer by a polymerization of a monomer mixture at a temperature of 210° C. or lower, wherein the monomer mixture comprises 0.01 to 35 mol % of monomer (a1) represented by the following general formula (1) and 65 to 99.99 mol % of monomer (a2) whose main component is methyl methacrylate.

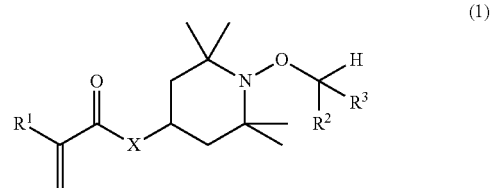

(1)

In the formula (1), $R^1$ represents a hydrogen atom or a methyl group, and X represents an oxygen atom, an imino group, the following general formula (2) or the following general formula (3). $R^2$ and $R^3$ represent a hydrogen atom, a linear alkyl group with a carbon number of 1 to 8, a branched alkyl group with a carbon number of 1 to 8, an alicyclic hydrocarbon with a carbon number of 6 to 8 which may have a substituent, or an aryl group which may have a substituent, and these may be identical to or different from each other. $R^2$ and $R^3$ may also form a cyclic structure, which may have a substituent.

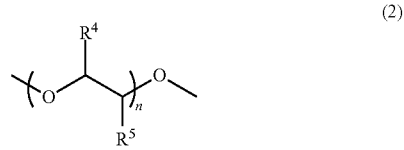

(2)

In the formula (2), n represents an integer of 1 to 10. $R^4$ and $R^5$ represent a hydrogen atom or methyl group, and at least one of $R^4$ and $R^5$ is a hydrogen atom.

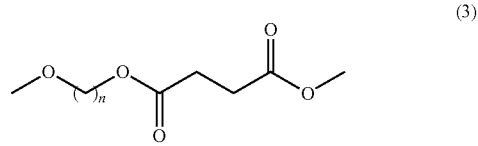

(3)

In the formula (3), n represents an integer of 1 to 10.

Also, the present invention is a method for producing a polymer by a polymerization of a mixture at a temperature of 210° C. or lower, wherein the mixture comprises a polymer and monomer (a2) whose main component is methyl methacrylate, wherein a content of the monomer (a1) unit is 0.01 to 35 mol %, wherein the polymer is obtained by a polymerization of a monomer mixture at a temperature of 210° C. or lower wherein the monomer mixture comprises monomer (a1) represented by the above-mentioned general formula (1) and monomer (a2) whose main component is methyl methacrylate.

Also, the present invention is a method for producing a polymer by a polymerization of a mixture at a temperature of 210° C. or lower, wherein the mixture comprises a polymer, which is obtained by a polymerization of a monomer mixture at a temperature of 210° C. or lower wherein the monomer mixture comprises monomer (a1) represented by the above-mentioned general formula (1) and monomer (a2) whose main component is methyl methacrylate, and monomer (a2) whose main component is methyl methacrylate, and wherein a content of the monomer (a1) unit is 0.01 to 35 mol %.

Further, in the case of which the polymerization of the monomer mixture is carried out by cast polymerization in the above-mentioned methods each, the present invention is a molded body obtained by the method.

Further, the present invention is a top cover for a solar power module using the above-mentioned molded body.

EFFECT OF THE INVENTION

According to the present invention, a non-colored molded body which has an excellent weathering resistance and in which the advantageous effect does not decrease with time is obtained. The molded body of the present invention has an excellent weathering resistance and the advantageous effect does not decrease with time, and the molded body can suitably be used for a top cover for a solar power module. In the top cover for a solar power module of the present invention, the transmission factor does not decrease and power generation efficiency of the solar power module does not decrease by long-term use.

MODE FOR CARRYING OUT THE INVENTION

Monomer (a1) used in the present invention is a polymerizable NOR-HALS, which is represented by the following general formula (1).

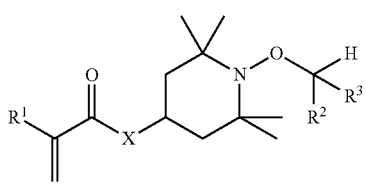

(1)

In the formula (1), $R^1$ represents a hydrogen atom or a methyl group, and X represents an oxygen atom, an imino group, the following general formula (2) or the following general formula (3). $R^2$ and $R^3$ represent a hydrogen atom, a linear alkyl group with a carbon number of 1 to 8, a branched alkyl group with a carbon number of 1 to 8, an alicyclic hydrocarbon with a carbon number of 6 to 8 which may have a substituent, or an aryl group which may have a substituent, and these may be identical to or different from each other. $R^2$ and $R^3$ may also form a cyclic structure, which may have a substituent.

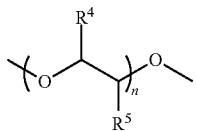

(2)

In the formula (2), n represents an integer of 1 to 10. $R^4$ and $R^5$ represent a hydrogen or a methyl group, and at least one of $R^4$ and $R^5$ is a hydrogen atom.

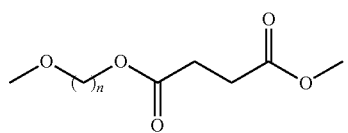

(3)

In the formula (3), n represents an integer of 1 to 10.

In the general formula (1), X is preferably an oxygen atom because the monomer (a1) is easily synthesized. Also, $R^2$ and $R^3$ are a linear alkyl group with a carbon number of 1 to 8, or a branched alkyl group with a carbon number of 1 to 8 because the molded body comes to have a good weathering resistance.

Examples of the monomer (a1) include, for example, 1-octyloxy-2,2,6,6-tetramethyl-4-(meth)acryloyloxypiperidine, 1-octyloxy-2,2,6,6-tetramethyl-4-(meth)acrylamidepiperidine, 1-propyloxy-2,2,6,6-tetramethyl-4-(meth)acryloyloxypiperidine, 1-propyloxy-2,2,6,6-tetramethyl-4-(meth)acrylamidepiperidine, 1-cyclohexyloxy-2,2,6,6-tetramethyl-4-(meth)acryloyloxypiperidine, 1-cyclohexyloxy-2,2,6,6-tetramethyl-4-(meth)acrylamidepiperidine, 1-methyloxy-2,2,6,6-tetramethyl-4-(meth)acryloyloxypiperidine, 1-methyloxy-2,2,6,6-tetramethyl-4-(meth)acrylamidepiperidine, 1-octyloxy-2,2,6,6-tetramethyl-4-(2-(2-(meth)acryloyloxy)ethoxy)-ethoxypiperidine, 1-octyloxy-2,2,6,6-tetramethyl-4-(4-(2-(meth)acryloyloxy)ethoxy-1,4-dioxo) butox piperidine.

Among them, 1-methyloxy-2,2,6,6-tetramethyl-4-(meth)acryloyloxypiperidine or 1-octyloxy-2,2,6,6-tetramethyl-4-(meth)acryloyloxypiperidine is preferable because the molded body comes to have a good weathering resistance.

The monomer (a1) may be used alone, or in combination with two or more kinds.

Note that, in the present invention, (meth)acryl means acryl or methacryl and (meth)-acryloyl means acryloyl or methacryloyl.

The monomer (a1) can be synthesized by a known method. For example, 1-octyloxy-2,2,6,6-tetramethyl-4-methacryloyloxypiperidine (hereinafter, referred to as "monomer (a1-1)") can be synthesized by carrying out an oxidation of 4-hydroxy-2,2,6,6-tetramethylpiperidine in a presence of sodium tungstate by 30% aqueous hydrogen peroxide, carrying out an acetyl protection of hydroxyl group in obtained 4-hydroxy-2,2,6,6-tetramethylpiperidine-N-oxide using acetic anhydride, carrying out a reaction by t-butyl hydroperoxide using octane as a solvent and a reactant, carrying out a deprotection of the acetyl protection, and thereafter carrying out a reaction with methacryloyl chloride.

Also, the monomer (a1-1) can be synthesized by the method disclosed in JP 2008-519003A. More specifically, it can be synthesized by oxidizing triacetone amine in a presence of sodium tungstate dihydrate by 30% hydrogen peroxide aqueous solution to convert it to triacetone amine-N- oxide, thereafter carrying out a reaction by 1-octene and t-butyl hydroperoxide, carrying out a reduction by a Ru-supported charcoal and hydrogen, and reacting a mixture of obtained 4-hydroxy-1-(1-octyloxy)-2,2,6,6-tetramethylpiperidine and 4-hydroxy-1-(3-octyloxy)-2,2,6,6-tetramethylpiperidine with methacryloyl chloride.

Also, 1-propyloxy-2,2,6,6-tetramethyl-4-methacryloyloxypiperidine (hereinafter, referred to as "monomer (a1-2)") can be synthesized according to the method of disclosed in JP 2008-519003 A except that propylene is used instead of 1-octene.

Also, 1-octyloxy-2,2,6,6-tetramethyl-4-(2-(2-methacryloyloxy)ethoxy)ethoxypiperidine (hereinafter, referred to as "monomer (a1-3)") can be synthesized by carrying out a acetyl protection of hydroxyl group of 2,2,6,6-tetramethyl-4-(2-(2-hydroxyethoxy)ethoxypiperidine-N-oxide using acetic anhydride, carrying out a reaction by t-butyl hydroperoxide using octane as a solvent and a reactant, carrying out a deprotection of the acetyl protection, and thereafter carrying out a reaction with methacryloyl chloride.

Also, 1-octyloxy-2,2,6,6-tetramethyl-4-(4-(2-methacryloyloxy)ethoxy-1,4-dioxo)-butoxypiperidine (hereinafter, referred to as "monomer (a1-4)") can be synthesized by carrying out an oxidation of 4-hydroxy-2,2,6,6-tetramethylpiperidine in a presence of sodium tungstate by 30% aqueous hydrogen peroxide, carrying out a acetyl protection of hydroxyl group of obtained 4-hydroxy-2,2,6,6-tetramethylpiperidine-N-oxide using acetic anhydride, carrying out a reaction by t-butyl hydroperoxide using octane as a solvent and a reactant, carrying out a deprotection of the acetyl protection, and thereafter carrying out dehydration condensation of the obtained carboxylic acid and 2-hydroxyethyl methacrylate.

Also, 1-methyloxy-2,2,6,6-tetramethyl-4-methacryloyloxypiperidine (hereinafter, referred to as "monomer (a1-5)") can be synthesized by synthesizing 1-methyloxy-2,2,6,6-tetramethyl-4-hydroxypiperidine and thereafter carrying out a reaction with methacryloyl chloride, according to the method of disclosed in JP 2009-541428 A. More specifically, it can be synthesized by reacting 2,2,6,6-tetramethyl-4-hydroxypiperidine-N-oxide with acetone and 30% hydrogen peroxide aqueous solution in a presence of copper (I) chloride, and reacting obtained 1-methyloxy-2,2,6,6-tetramethyl-4-hydroxypiperidine with methacryloyl chloride.

Monomer (a2) used in the present invention is a monomer whose main component is methyl methacrylate. In the present invention, "main component" means 50 wt % or more of the total. The monomer (a2) has a methyl methacrylate content of 50 wt % or more, preferably 75 wt % or more, and more preferably 90 wt % or more. In this regard, the total amount of the monomer (a2) is set to be 100 wt %. If the monomer (a2) has a methyl methacrylate content of 50 wt % or more, the molded body obtained comes to have a good appearance, a good mechanical strength, and a good weathering resistance.

The monomer (a2) can contain a monomer except for methyl methacrylate. The monomer (a2) has a monomer content except for methyl methacrylate of 50 wt % or less, preferably 25 wt % or less, and more preferably 10 wt % or less. If the monomer (a2) has a monomer except for methyl methacrylate of 50 wt % or less, the molded body obtained comes to have a good appearance, a good mechanical strength, and a good weathering resistance.

Example of the monomer except for methyl methacrylate contained in the monomer (a2) include, for example, (meth)acrylates such as methyl acrylate, ethyl (meth)acrylate, cyclohexyl (meth)acrylate, isobornyl(meth)acrylate, phenyl (meth)acrylate, and benzyl (meth)-acrylate; aromatic vinyl monomers such as styrene and α-methyl styrene; silicon containing monomers such as vinyl trimethoxysilane; maleic acid type monomers such as maleic anhydride, maleic acid, and maleic acid monoalkyl ester; fumaric acid type monomers such as fumaric acid and fumaric acid monoalkyl ester; maleimide type monomers such as maleimide and N-methyl maleimide; vinyl cyanide monomers such as (meth)acrylonitrile; and cross-linkable monomers such as ethyleneglycol di(meth)acrylate and divinylbenzene. This may be used alone, or in combination with two or more kinds. Among these, aromatic vinyl monomers such as styrene and vinyl cyanide monomers are preferable because the molded body obtained comes to have a good appearance, a good mechanical strength, and a good weathering resistance.

The polymer of the present invention can be produced by the following three methods.

Method 1: polymerizing a monomer mixture at a temperature of 210° C. or lower, wherein the monomer mixture comprises 0.01 to 35 mol % of monomer (a1) and 65 to 99.99 mol % of monomer (a2).

Method 2: polymerizing a mixture at a temperature of 210° C. or lower, wherein the mixture comprises a polymer consisting of monomer (a2) unit, monomer (a1), and monomer (a2), and wherein a content of the monomer (a1) is 0.01 to 35 mol %.

Method 3: polymerizing a mixture at a temperature of 210° C. or lower, wherein the mixture comprises a polymer, which is obtained by a polymerization of a monomer mixture at a temperature of 210° C. or lower wherein the monomer mixture comprises monomer (a1) and monomer (a2), and monomer (a2), and wherein a content of the monomer (a1) unit is 0.01 to 35 mol %.

Hereinafter, the method 1 is explained.

The monomer mixture used in the method 1 contains 0.01 to 35 mol % of monomer (a1) and 65 to 99.99 mol % of monomer (a2). In this regard, the total amount of the monomer mixture is set to be 100 mol %. The monomer mixture contains 0.03 to 1 mol % of monomer (a1) and 99 to 99.97 mol % of monomer (a2). If the content of the monomer (a1) in the monomer mixture is 0.01 mol % or more, there is a sufficient advantageous effect of weathering resistance improvement. If it is 35 mol % or less, the molded body obtained comes to have a good appearance and a good mechanical strength.

The monomer mixture is polymerized at a temperature of 210° C. or lower. Note that, in the present invention, the highest treatment temperature in the polymerization is called "polymerization temperature." The polymerization temperature is preferably in a range of 40 to 210° C., more preferably in a range of 110 to 210° C., and particularly preferably in a range of 110 to 180° C. Also, it is particularly preferable to carryout the polymerization at two step polymerization temperatures, one of which is 40 to 90° C. for a first step, and another of which is 100 to 140° C. for a second step. If the polymerization temperature is 210° C. or lower, R which is connected to nitroxide of the monomer (a1) is not dissociated during the polymerization, and coloration of the molded body obtained is not confirmed. Also, if the polymerization temperature is 40° C. or more, the polymerization conversion ratio of the monomer used improves.

Examples of the method for polymerizing the monomer mixture include, for example, solution polymerization, suspension polymerization, emulsion polymerization, and cast polymerization. Among these, cast polymerization is preferable because the molded body can directly be obtained. By cast polymerization, an additional heating in the molding step such as injection molding or extrusion molding is not necessary and a molded body using monomer (a1) can be produced without coloration.

Next, the method 2 is explained.

In the method 2, a polymer consisting of monomer (a2) unit is first mixed with monomer (a1) and monomer (a2) which are separately provided, to obtain a mixture. The polymer used in the method 2 is obtained by polymerizing monomer (a2). The method for polymerizing monomer (a2) can be, but should not be limited to, a known method.

The ratio of the polymer and the monomer (a1+a2) in the mixture is preferably such that the polymer is 0.1 to 80 wt % and the monomer (a1+a2) is 20 to 99.9 wt %. In this regard, the total amount of the mixture is set to be 100 wt %. The mixture preferably contains 1 to 50 wt % of the polymer and 50 to 99 wt % of the monomer (a1+a2). If the content of the polymer in the mixture is in a range of 0.1 to 80 wt %, the viscosity of the mixture can be controlled in a range of providing a good workability. Further, the volume shrinkage of the molded body with the polymerization progress can be suppressed.

In the mixture, the content of the monomer (a1) is 0.01 to 35 mol % and the content of the other components is 65 to 99.99 mol %. In this regard, the sum of the total mol number of the monomers in the mixture and the total mol number of the monomer unit composing the polymer is set to be 100 mol %. The mixture preferably contains 0.03 to 1 mol % of the monomer (a1) and 99 to 99.97 mol % of the other components. If the content of the monomer (a1) in the mixture is 0.01 mol % or more, there is a sufficient advantageous effect of weathering resistance improvement. If it is 35 mol % or less, the molded body obtained comes to have a good appearance and a good mechanical strength.

The mixture obtained is polymerized at a temperature of 210° C. or lower. The embodiment of the polymerization temperature is the same as that of the polymerization temperature for the monomer mixture shown in method 1. Examples of the method for polymerizing the mixture include, for example, solution polymerization, suspension polymerization, and cast polymerization. Among these, cast polymerization is preferable because the molded body can directly be obtained.

Next, the method 3 is explained.

In the method 3, a polymer, which is obtained by a polymerization of a monomer mixture at a temperature of 210° C. or lower wherein the monomer mixture comprises monomer (a1) and monomer (a2), is first mixed with monomer (a2) which is separately provided, to obtain a mixture.

The monomer mixture is polymerized at a temperature of 210° C. or lower. The embodiment of the polymerization temperature is the same as that of the polymerization temperature for the monomer mixture shown in method 1. The polymerization method is not particularly limited.

The ratio of the polymer and the monomer (a2) in the mixture is preferably such that the polymer is 0.1 to 80 wt % and the monomer (a2) is 20 to 99.9 wt %. In this regard, the total amount of the mixture is set to be 100 wt %. The mixture preferably contains 1 to 50 wt % of the polymer and 50 to 99 wt % of the monomer (a2). If the content of the polymer in the mixture is in a range of 0.1 to 80 wt %, the viscosity of the mixture can be controlled in a range of providing a good workability. Further, the volume shrinkage of the molded body with the polymerization progress can be suppressed.

The admixture can contain a polymer consisting of monomer (a2) unit if needed.

In the mixture, the content of the monomer (a1) unit is 0.01 to 35 mol % and the content of the other components is 65 to 99.99 mol %. In this regard, the sum of the total mol number of the monomers in the mixture and the total mol number of the monomer units composing the polymer is set to be 100 mol %. The mixture preferably contains 0.03 to 1 mol % of the monomer (a1) unit and 99 to 99.97 mol % of the other components. If the content of the monomer (a1) unit in the mixture is 0.01 mol % or more, there is a sufficient advantageous effect of weathering resistance improvement. If it is 35 mol % or less, the molded body obtained comes to have a good appearance and a good mechanical strength.

The mixture obtained is polymerized at a temperature of 210° C. or lower. The embodiment of the polymerization temperature is the same as that of the polymerization temperature for the monomer mixture shown in method 1. Examples of the method for polymerizing the mixture include, for example, solution polymerization, suspension polymerization, and cast polymerization. Among these, cast polymerization is preferable because the molded body can directly be obtained.

The method of the cast polymerization is concretely described. In the cast polymerization, after an addition of polymerization initiator and the like to a monomer mixture, the polymerization is carried out in a mold. As shown in the methods 2 and 3, a mixture of a polymer and a monomer can be used instead of the monomer mixture.

Examples of the polymerization method include, for example, radical polymerization and anionic polymerization, and radical polymerization is preferable. Examples of the radical polymerization initiator include, for example, organic peroxides such as benzoyl peroxide, di-t-butyl peroxide, t-hexyl peroxypivalate, and t-hexyl peroxy isopropyl carbonate; azo initiators such as 2,2'-azobisisobutyronitrile, 2,2'-azobis-2,4-dimethylvaleronitrile, 2,2'-azobis(4-methoxy-2,4-dimethylvaleronitrile), and 2,2'-azobis-2-methylbutyronitrile. Among the radical polymerization initiators, benzoyl peroxide, 2,2'-azobisisobutyronitrile, 2,2'-azobis-2,4-dimethylvaleronitrile, and t-hexyl peroxypivalate are preferable because of a good workability.

The amount of the radical polymerization initiator used is preferably 0.001 to 1 mol with respect to 100 mol of the monomer, and is more preferably 0.01 to 1 mol.

In the cast polymerization, a chain transfer agent such as mercaptan may be used for controlling the molecular weight of the molded body obtained. Also, the cast polymerization is preferably carried out under an atmosphere without oxygen.

In the cast polymerization, an additive such as a UV absorber, a light stabilizer, an antioxidant, an antistatic agent, an antimicrobial agent, a flame retardant, an impact modifier, a light diffusing agent, a chain transfer agent, a filler, or a reinforcing agent may be compounded. The amount of the additive compounded varies according to the use, but is preferably 5 wt % or less to the total amount. If the amount of the additive compounded is 5 wt % or less, the decrease of the glass transition temperature of the molded body obtained is small and the molded body comes to have a good heat resistance.

Examples of the UV absorber and the light stabilizer include the following.

2-(2'-hydroxyphenyl)benzotriazoles: which include, for example, 5'-methyl derivative (made by Ciba JAPAN, TV-P), and 3',5'-di-t-butyl-, 5'-t-butyl-, 5'-(1,1,3,3-tetramethylbutyl)-, 5-chloro-3',5'-di-t-butyl-, 5-chloro-3'-t-butyl-5'-methyl, 3'-s-butyl-5'-t-butyl, 4'-octoxy-, 3',5'-di-tertiary-amyl-, 3',5'-bis(α,α-dimethylbenzyl)-, 3'-t-butyl-5'-2-(ω-hydroxyocta-(ethyleneoxy)-carbonylethyl)-, 3'-dodecyl-5'-methyl-, 3'-t-butyl-5'-(2-octyloxycarbonyl)-ethyl, and dodecylated-5'-methyl derivatives.

2-hydroxy-benzophenones: which include, for example, 4-hydroxy-, 4-methoxy-, 4-octoxy-, 4-decyloxy-, 4-dodecyloxy-, 4-benzyloxy-, 4,2',4'-trihydroxy-, and 2'-hydroxy-4,4'-dimethoxy derivatives.

Steric hindered amine: which include, for example, bis(2,2,6,6-tetramethyl-4-piperidyl)sebacate (made by ADEKA CORPORATION, LS770), bis(1,2,2,6,6-pentamethyl-4-piperidyl)sebacate (made by Ciba JAPAN, TV-292), bis(1-octyloxy-2,2,6,6-pentamethyl-4-piperidyl)sebacate (made by Ciba JAPAN, TV-123), 2,4-bis[N-butyl-N-(1-cyclohexyloxy-2,2,6,6-tetramethylpiperidine-4-yl)amino]-6-(2-hydroxyethylamine)-1,3,5-triazine (made by Ciba JAPAN, TV-152), bis(1,2,2,6,6-pentamethylpiperidyl)-n-butyl-3,5-di-t-butyl-4-hydroxybenzyl malonate, a condensation product of 1-hydroxyethyl-2,2,6,6-tetramethyl-4-hydroxypiperidine and succinic acid, a condensation product of N,N'-bis(2,2,6,6-tetramethylpiperidyl)hexamethylene diamine and 4-tertiary-octylamino-2,6-dichloro-s-triazine, tris(2,2,6,6-tetramethyl-4-piperidyl)nitrilo triacetate, tetrakis(2,2,6,6-tetramethyl-4-piperidyl)-1,2,3,4-butane tetracarboxylate, and 1,1'-(1,2-ethanediyl)-bis(3,3,5,5-tetramethylpiperazinone).

Hydroxyphenyl-s-triazines: which include, for example, 2,6-bis-(2,4-dimethylphenyl)-4-(2-hydroxy-4-octyloxyphenye-s-triazine, 2,6-bis-(2,4-dimethylphenyl)-4-(2,4-dihydroxyphenyl)-s-triazine, 2,4-bis-(2,4-dihydroxyphenyl)-6-(4-chlorophenyl)-s-triazine, 2,4-bis-[2-hydroxy-4-(2-hydroxyethoxy)phenyl]-6-(4-chlorophenyl)-s-triazine, 2,4-bis-[2-hydroxy-4-(2-hydroxyethoxy)-phenyl]-6-phenyl-s-triazine, 2,4-bis-[2-hydroxy-4-(2-hydroxyethoxy)phenyl]-6-(2,4-dimethyl-phenyl)-s-triazine, 2,4-bis-[2-hydroxy-4-(2-hydroxyethoxy)phenyl]-6-(4-bromophenyl)-s-triazine, 2,4-bis-[2-hydroxy-4-(2-acetoxyethoxy)phenyl]-6-(4-chlorophenyl)-s-triazine, and 2,4-bis(2,4-dihydroxyphenyl)-6-(2,4-dimethyl phenyl)-s-triazine.

In addition, 2-hydroxy-benzophenone derivatives, nickel compounds, and diamide oxalates.

Examples of the antioxidant include the following.

Alkylated monophenols: which include, for example, 2,6-di-t-butyl-4-methylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, and 2,6-di-t-butyl-4-methoxymethylphenol.

Alkylated hydroquinones: which include, for example, 2,6-di-t-butyl-4-methoxyphenol, 2,5-di-t-butyl hydroquinone, 2,5-di-tertiary-amyl hydroquinone, and 2,6-di-phenyl-4-octadecyloxyphenol.

In addition, hydroxylated dithiophenyl ethers, alkylidene bisphenols, benzyl compounds, and acylaminophenols.

Examples of the mold include a mold composed of a board body such as a reinforced glass, a chrome plating board, or a stainless steel board, and a gasket such as a soft vinyl chloride; and a mold composed of two endless belts which are faced each other and run in the same direction at the same speed, and of a gasket which runs at the same speed as the endless belts at both side edges of the faced surface of the endless belts.

The temperature at which the molded body obtained is detached from the mold after a cast polymerization (hereinafter, referred to as "detaching temperature"), is preferably 70 to 110° C. The lower limit of the detaching temperature is more preferably 75° C. or higher, and further preferably 80° C. or higher. If the detaching temperature is 70° C. or higher, the surface is hardly damaged when the molded body is detached from the mold. Also, if the detaching temperature is 110° C. or lower, a line-shaped defect is not produced in the surface of the molded body.

In the case of which the molded body is a board body, the thickness is preferably in a range of 0.5 to 15 mm.

The molded body is preferably composed of a polymer with a number average molecular weight of 1000 to $100 \times 10^4$, and more preferably composed of a polymer with a number average molecular weight of 2000 to $50 \times 10^4$. If the polymer has a number average molecular weight of 1000 or more, volatilization of the polymer is suppressed.

Since the molded body of the present invention has a high weathering resistance, it is useful for an article used outdoors such as a building material and is specifically useful for a top cover for a solar power module.

The material used for a top cover which covers the outermost surface (light receiving surface side) for a solar power module is usually a glass board and a transparence resin board. The use of a transparence resin board for a top cover has the advantage of enabling the weight reduction of the solar power module in comparison with the use of a glass board. However, in a conventional transparence resin board, there is a problem that the resin is deteriorated by long-term use and the power generation efficiency decreases due to the decrease of the transparency. Since the molded body of the present invention has a high weathering resistance, when it is used as a top cover for a solar power module, the resin is not deteriorated by long-term use and the power generation efficiency does not decrease due to the decrease of the transparency. The top cover for a solar power module of the present invention can be used for a-known solar cell.

EXAMPLES

As follows, the present invention is concretely explained by the Examples, but the present invention is not limited to these Examples. Note that, "part(s)" and "%" in the Examples represents "part(s) by mass" and "mass %".

(1) Identification of Monomer (a1)

For the confirmation of monomer (a1) structure, $^1$H-NMR JNM-EX270 (made by JEOL Ltd., trade name) was used. The monomer (a1) was dissolved in deuterated chloroform, and the chemical compound was identified from the integral intensity of the peak and from the peak position. The measurement temperature is 25° C. and the number of scans is 16 times.

(2) Polymerization Conversion Ratio

For the confirmation of the polymerization conversion ratio of the monomer, $^1$H-NMR JNM-EX270 (made by JEOL Ltd., trade name) was used. In the case of a copolymerization of monomer (a1) and methyl methacrylate, the polymerization conversion ratio was calculated from the integral ratio of the peaks which belong to hydrogen of alkoxy group derived from the monomer and the polymer and to hydrogen of C—C double bond derived from the monomer.

(3) Appearance

A molded body was observed by visual inspection to judge the presence or absence of coloration.

(4) Glass-Transition Temperature (Tg)

For Tg, DSC6220 (trade name) made by SII NanoTechnology Inc. was used. In the measurement under nitrogen atmosphere, melt quench was carried out at 200° C. for 3 minutes, and the temperature was raised from 20° C. to 250° C. at 10° C./m.

(5) Number Average Molecular Weight (Mn) and Molecular Weight Distribution (PDI)

These were measured using GPC (made by Tosoh Corporation, HLC-8220 (trade name), columns: TSK GUARD COLUMN SUPER HZ-L (4.6×35 mm) and TSK-GEL SUPER HZM-N (6.0×150 mm)×2 serial connection, eluent: chloroform, measurement temperature: 40° C., flow rate: 0.6 mL/minute), with polymethyl methacrylates as a standard.

(6) Weathering Test (Condition 1)

A molded body was cut to 40 mm×40 mm and the surface was washed with a neutral detergent. After that, a weathering test was carried out at an irradiation intensity of 80 mw/cm² at 63° C. for 344 hours by metal weather KU-R5N-A (made by DAIPLA WINRES Co., LTD., trade name). The transmission spectra before and after the weathering test were measured by spectrophotometer MCPD-3000 (made by Otsuka electronics Co., Ltd., trade name), and the yellow factors were measured. The measured value was adjusted by the sample thickness according to the following expression.

yellow degree (adjusted value)=yellow factor (measured value)/board thickness (mm)

Also, the difference between the yellow factors (adjusted value) before and after the weathering test was estimated to be a "displacement" of the yellow factor.

(7) Weathering Test (Condition 2)

A molded body was cut to 30 mm×30 mm and the surface was washed with a neutral detergent. After that, a weathering test was carried out for 432 hours in which the process was repeated 18 times which consists of: keeping the specimen at an irradiation intensity of 110 mw/cm² at 65° C. for 16 hours by metal weather KW-R5TP-A (made by DAIPLA WINRES Co., LTD., trade name), thereafter keeping the specimen at an irradiation intensity of 0 mw/cm² at 65° C. for 2 hours, thereafter washing the specimen surface with water for 10 seconds, keeping it at an irradiation intensity of 0 mw/cm² at 30° C. for 6 hours, and washing the specimen surface with water for 10 seconds. The transmission spectra before and after the weathering test were measured by spectrophotometer MCPD-3000 (made by Otsuka electronics Co., Ltd., trade name), and the yellow factors were measured. The measured value was adjusted by the sample thickness according to the following expression.

yellow factor (adjusted value)=yellow factor (measured value)×3/board thickness (mm)

Also, the difference between the yellow factors (adjusted value) before and after the weathering test was estimated to be a "displacement" of the yellow factor.

Synthesis Example 1

Synthesis of Monomer (a1-1)

To a solution in which 30.3 g (300 mmol) of triethylamine and 34.4 g (200 mmol) of 4-hydroxy-2,2,6,6-tetramethylpiperidine-N-oxide (TEMPOL) were dissolved in 200 mL of tetrahydrofuran (THF), 25.5 g (250 mmol) of acetic anhydride was added at 0° C. The temperature was raised to 25° C. to carry out a reaction for 12 hours, and it was then concentrated by a rotary evaporator. The residue was supplied to 1 liter of iced water, and the precipitated orange solid was collected by filtration to obtain 33.8 g of 4-acetyloxy-2,2,6,6-tetramethylpiperidine-N-oxide.

21.4 g (100 mmol) of 4-acetyloxy-2,2,6,6-tetramethylpiperidine-N-oxide was dissolved in 200 mL of octane and 0.9 g (6 mmol) of molybdenum oxide (VI) was added, and it was heated to reflux for dehydration. With dehydration by azeotropy, 19.2 g (150 mmol) of 70% t-butyl hydroperoxide aqueous solution was dropped for 9 hours to carry out a reaction. After a cooling to room temperature, 30 ml of saturated sodium bisulfite aqueous solution was added slowly to deactivate the unreacted peroxide. After a concentration of the organic layer by a rotary evaporator, the residue was dissolved in 100 mL of ethanol and 6.7 g (150 mmol) of potassium hydroxide was added to carry out a reaction at 25° C. for 2 hours.

The mixture was concentrated by a rotary evaporator and 200 mL of water was added to the residue, and an extraction was carried out using 200 mL in total of dichloromethane. After a concentration of the organic layer by a rotary evaporator, it was dissolved in 20 mL of di-chloromethane and 10 mL of triethylamine, and 10.5 g (100 mmol) of methacryloyl chloride was added at 0° C. to carry out a reaction for 1 hour. The mixture was concentrated by a rotary evaporator and 200 mL of water was added, and an extraction was carried out using 200 mL in total of ethyl acetate. The organic layer was concentrated by a rotary evaporator, and the residue was purified by column chromatography (silica gel, hexane/ethyl acetate=20/1, volume ratio) to obtain 26.3 g of a colorless liquid (74.4% yield).

By a ¹H-NMR measurement, it was confirmed that the product was monomer (a1-1).

¹H-NMR (CDCl₃): δ (ppm): 0.89 (m, 6H), 1.17 (m, 10H), 1.18 (s, 6H), 1.21 (s, 6H), 1.61 (m, 2H), 1.85 (m, 2H), 1.92 (s, 3H), 3.60-3.93 (m, 1H), 5.07 (m, 1H), 5.53 (s, 1H), 6.03 (s, 1H)

The structure of the monomer (a1-1) is shown in the following formula (4).

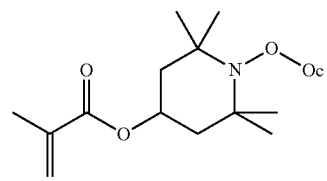

(4)

In the formula (4), Oc is a structure represented by the following formulae (5) to (7). Hereinafter, the following formulae (5) to (7) represent "Oc".

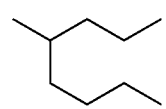

(5)

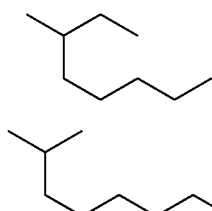

(6)

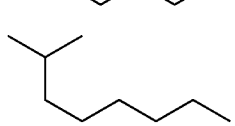

(7)

Synthesis Example 2

Synthesis of Monomer (a1-2)

To a solution in which 48.6 g (480 mmol) of triethylamine and 68.9 g (400 mmol) of 4-hydroxy-2,2,6,6-tetramethylpiperidine-N-oxide (TEMPOL) were dissolved in 100 mL of di-chloromethane, 47.8 g (440 mmol) of trimethylsilyl chloride was added at 0° C. The temperature was raised to 25° C. to carry out a reaction for 2 hours, and it was then concentrated by a rotary evaporator. To the residue 500 ml of water was added, and an extraction was carried out using 500 ml in total of ethyl acetate. The organic layer was concentrated by a rotary evaporator and the residue was dissolved in hexane and recrystallized to obtain 96.2 g of 4-trimethylsilyloxy-2,2,6,6-tetramethylpiperidine-N-oxide.

4.6 g (190 mmol) of a chip-type magnesium, 100 ml of dehydrated THF, and 10 mg of iodine were supplied to a reaction container and the vessel was substituted by argon. After that, 23.4 g (190 mmol) of 1-bromopropane was dropped with keeping the temperature inside the vessel in a range of 55° C. to 65° C. to prepare a Grignard reactant.

In another reaction vessel, 96.2 g (394 mmol) of 4-trimethylsilyloxy-2,2,6,6-tetramethylpiperidine-N-oxide was dissolved in 100 ml of dehydrated THF, and the Grignard reactant prepared was dropped at 0° C. After a reaction for 3 hours, the solution was concentrated by a rotary evaporator. 500 mL of water was added to the residue and an extraction was carried out using 500 mL in total of ethyl acetate, and the organic layer was concentrated by a rotary evaporator. The residue was purified by column chromatography (silica gel, hexane/ethyl acetate=20/1, volume ratio) to obtain 38.5 g of 1-(1-propyl)oxy-2,2,6,6-tetramethyl-4-trimethylsilyloxypiperidine.

38.5 g of 1-(1-propyl)oxy-2,2,6,6-tetramethyl-4-trimethylsilyloxypiperidine was dissolved in 300 ml of methanol and 0.14 g (0.1 mmol) of potassium carbonate was added to carry out a reaction for 3 hours. After that, the solution was concentrated by a rotary evaporator. 300 mL of water was added to the residue, and an extraction was carried out using 300 mL in total of ethyl acetate. The organic layer was concentrated by a rotary evaporator and the residue was dissolved in 20 ml of dichloromethane and 20 ml of triethylamine, and 14.1 g (135 mmol) of methacryloyl chloride was dropped at 0° C. After a reaction for 1 hour, the precipitated triethylamine hydrochloride was filtered, and the solution was concentrated by a rotary evaporator. The residue was purified by column chromatography (silica gel, hexane/ethyl acetate=20/1, volume ratio) to obtain 29.7 g of a colorless liquid (26.2% yield).

By a $^1$H-NMR measurement, it was confirmed that the product was monomer (a1-2).

$^1$H-NMR (CDCl$_3$): δ (ppm): 0.94 (t, 3H), 1.21 (s, 12H), 1.53 (m, 2H), 1.61 (m, 2H), 1.86 (m, 2H), 1.92 (s, 3H), 3.70 (t, 2H), 5.07 (m, 1H), 5.53 (s, 1H), 6.06 (s, 1H)

The structure of the monomer (a1-2) is shown in the following formula (8).

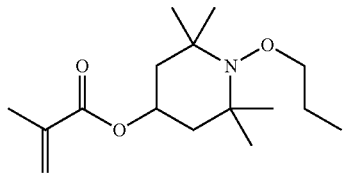

(8)

Synthesis Example 3

Synthesis of Monomer (a1-3)

To a solution in which 20.2 g (200 mmol) of triethylamine and 26.0 g (100 mmol) of 2,2,6,6-tetramethyl-4-(2-(2-hydroxy)ethoxy)ethoxypiperidine-N-oxide were dissolved in 100 mL of THF, 12.3 g (120 mmol) of acetic anhydride was added at 0° C. The temperature was raised to 25° C. to carry out a reaction for 12 hours, and it was then concentrated by a rotary evaporator. 500 ml of water was added to the residue, and an extraction was carried out using 500 mL in total of ethyl acetate. After a concentration of the organic layer by a rotary evaporator, and the residue was purified by column chromatography (silica gel, hexane/ethyl acetate=1/1, volume ratio) to obtain 5.6 g (22 mmol) of 2,2,6,6-tetramethyl-4-(2-(2-acetyloxy)ethoxy)ethoxypiperidine-N-oxide.

3.0 g (10 mmol) of 2,2,6,6-tetramethyl-4-(2-(2-acetyloxy)ethoxy)ethoxypiperidine-N-oxide was dissolved in 100 mL of octane and 0.07 g (0.5 mmol) of molybdenum oxide (VI) was added, and it was heated to reflux for dehydration. With dehydration by azeotropy, 12.8 g (100 mmol) of 70% t-butyl hydroperoxide aqueous solution was dropped for 6 hours to carry out a reaction. After a cooling to room temperature, 20 ml of saturated sodium bisulfite aqueous solution was added slowly to deactivate the unreacted peroxide. After a concentration of the organic layer by a rotary evaporator, the residue was dissolved in 15 mL of ethanol and 0.6 g (15 mmol) of sodium hydroxide was added to carry out a reaction at 25° C. for 2 hours.

The mixture was concentrated by a rotary evaporator and 100 mL of water was added to the residue, and an extraction was carried out using 100 mL in total of dichloromethane. After a concentration of the organic layer by a rotary evaporator, it was dissolved in 10 mL of triethylamine, and 1.1 g (10 mmol) of methacryloyl chloride was added at 0° C. to carry out a reaction for 1 hour. The mixture was concentrated by a rotary evaporator and 50 mL of water was added, and an extraction was carried out using 50 mL in total of ethyl acetate. The organic layer was concentrated by a rotary evaporator, and the residue was purified by column chromatography (silica gel, hexane/ethyl acetate=3/1, volume ratio) to obtain 1.9 g (3.1 mmol) of a colorless liquid (3.1% yield).

By a $^1$H-NMR measurement, it was confirmed that the product was monomer (a1-3).

$^1$H-NMR (CDCl$_3$): δ (ppm): 0.89 (m, 6H), 1.14 (s, 12H), 1.28 (m, 10H), 1.35-1.47 (m, 2H), 1.63-1.84 (m, 2H), 1.95 (s, 3H), 3.54-3.87 (m, 2H), 3.61 (m, 4H), 3.75 (t, 2H), 4.30 (t, 2H), 5.57 (s, 1H), 6.14 (s, 1H)

The structure of the monomer (a1-3) is shown in the following formula (9).

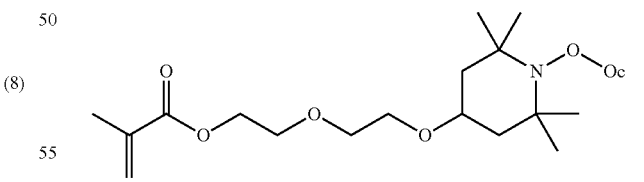

(9)

Synthesis Example 4

Synthesis of Monomer (a1-4)

6.4 g (30 mmol) of 4-acetyloxy-2,2,6,6-tetramethylpiperidine-N-oxide synthesized by the method described in Synthesis Example 1 was dissolved in 100 mL of octane and 0.1 g (0.7 mmol) of molybdenum oxide (VI) was added, and it was heated to reflux for dehydration. With dehydration by azeotropy, 12.8 g (100 mmol) of 70% t-butyl hydroperoxide aqueous solution was dropped for 6 hours to carry out a reaction. After a cooling to room temperature, 50 ml of saturated sodium bisulfite aqueous solution was added slowly to deactivate the unreacted peroxide. After a concentration of the organic layer by a rotary evaporator, the residue was dissolved in 50 mL of ethanol and 2.8 g (50 mmol) of potassium hydroxide was added to carry out a reaction at 25° C. for 4 hours.

The mixture was concentrated by a rotary evaporator and 100 mL of water was added to the residue, and an extraction was carried out using 100 mL in total of dichloromethane. The organic layer was concentrated by a rotary evaporator. To the residue, 20 ml of tetrahydrofuran, 4.0 g (40 mmol) of triethylamine, and 3.0 g (30 mmol) of succinic anhydride were added, and a stirring was continuously carried out at 70° C. for 4 hours. After 4 hours, it was concentrated by a rotary evaporator and 100 mL of saturated ammonium chloride aqueous solution was added to the residue, and an extraction was carried out using 100 mL in total of ethyl acetate.

The organic layer was concentrated by a rotary evaporator and 3.9 g (30 mmol) of 2-hydroxyethyl methacrylate, 0.24 g (2 mmol) of N,N'-dimethyl-4-aminopyridine, and 5 ml of di-chloromethane were added to the residue, and it was dropped at 0° C. to a solution in which 6.2 g (30 mmol) of N,N'-dicyclohexylcarbodiimide was dissolved in 20 ml of dichloromethane, to carry out a reaction for 4 hours. After 4 hours, the precipitated solid was filtered, and the filtrate was concentrated by a rotary evaporator. The residue was purified by column chromatography (silica gel, hexane/ethyl acetate=5/1, volume ratio) to obtain 5.58 g of a colorless liquid (56.1% yield).

By a $^1$H-NMR measurement, it was confirmed that the product was monomer (a1-4).

$^1$H-NMR (CDCl$_3$): δ (ppm): 0.89 (m, 6H), 1.15 (s, 6H), 1.18 (s, 6H), 1.29 (m, 10H), 1.30-1.41 (m, 2H), 1.59-1.82 (m, 2H), 1.95 (s, 3H), 2.62 (m, 4H), 3.73 (m, 1H), 4.35 (s, 4H), 5.02 (m, 1H), 5.60 (s, 1H), 6.13 (s, 1H)

The structure of the monomer (a1-4) is shown in the following formula (10).

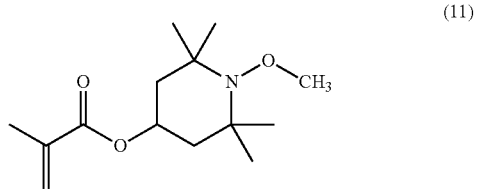 [SMILES: C=C(C)C(=O)OC1CC(C)(C)N(OC)C(C)(C)C1]

(10)

Synthesis Example 5

Synthesis of Monomer (a1-5)

17.8 g (100 mmol) of 2,2,6,6-tetramethyl-4-hydroxypiperidine-N-oxide was dissolved in 100 ml of acetone, and 34 g (300 mmol) of 30% hydrogen peroxide aqueous solution was added slowly for more than 10 minutes. With a cooling to 5° C., 0.49 g (5.0 mol %) of copper (I) chloride was added with keeping the temperature of the reaction mixture in a range of 5° C. to 55° C. After 15 minutes, 0.5 g of 35% hydrochloric acid was added, and the reaction mixture was stirred at room temperature for 2 hours. After 2 hours, 50 ml of 4 mol/L sodium bisulfite aqueous solution, and 100 ml of saturated potassium hydrogen carbonate aqueous solution were added, and an extraction was carried out using 300 mL of ethyl acetate. The organic layer was concentrated by a rotary evaporator to obtain 1-methyloxy-2,2,6,6-tetramethyl-4-hydroxypiperidine.

The obtained 1-methyloxy-2,2,6,6-tetramethyl-4-hydroxypiperidine was dissolved in 50 ml of dichloromethane and 50 ml of triethylamine, and 10.4 g (100 mmol) of methacryloyl chloride was added slowly at 0° C. With a slow temperature increase to room temperature, a reaction was carried out for 1 hour. After 1 hour, the reaction mixture was concentrated by a rotary evaporator and 300 ml of water was added, and an extraction was carried out using 300 ml of ethyl acetate. The organic layer was concentrated by a rotary evaporator, and the residue was purified by column chromatography (silica gel, hexane/ethyl acetate=10/1, volume ratio) to obtain 19.0 g of a colorless liquid (74.3% yield).

By a $^1$H-NMR measurement, it was confirmed that the product was monomer (a1-5).

$^1$H-NMR (CDCl$_3$): δ (ppm): 1.19 (s, 6H), 1.23 (s, 6H), 1.60 (m, 2H), 1.87 (m, 2H), 1.92 (s, 3H), 3.62 (s, 3H), 5.07 (m, 1H), 5.53 (s, 1H), 6.06 (s, 1H)

The structure of the monomer (a1-5) is shown in the following formula (11).

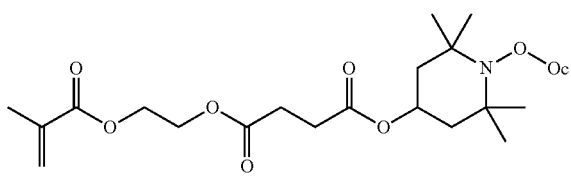

(11)

Synthesis Example 6

Synthesis of Monomer (a1-6)

4.3 g (20 mmol) of 4-acetyloxy-2,2,6,6-tetramethylpiperidine-N-oxide synthesized by the method described in Synthesis Example 1 was dissolved in 20 mL of cumene and 11.7 g (80 mmol) of t-butyl peroxide was added slowly. After a nitrogen bubbling for 30 minutes, it was transferred to a UV laboratory reaction apparatus (System1) made by Heraeus K. K. Light irradiation was performed using a TQ150 type lamp for 10 minutes to carry out a reaction. The reaction mixture was concentrated by a rotary evaporator, and the residue was purified by column chromatography (silica gel, hexane/ethyl acetate=5/1, volume ratio) to obtain 5.5 g of 1-cumyloxy-2,2,6,6-tetramethyl-4-acetyloxypiperidine was obtained (82.3% of yield).

The obtained 1-cumyloxy-2,2,6,6-tetramethyl-4-acetyloxypiperidine was dissolved in 30 ml of methanol and 1.0 g (25 mmol) of sodium hydroxide was added, and it was stirred at room temperature for 40 minutes. 100 mL of water was added to the residue, and an extraction was carried out using 200 mL of ethyl acetate. The organic layer was concentrated by a rotary evaporator and the residue was dissolved in 4 ml of triethylamine. 1.9 g (18 mmol) of methacryloyl chloride was added slowly at 0° C., and with a slow temperature increase to room temperature, a reaction was carried out for 1 hour. After 1 hour, the reaction mixture was concentrated by a rotary evaporator and 100 mL of water was added to the residue, and an extraction was carried out using 200 mL of ethyl acetate. The organic layer was concentrated by a rotary evaporator and the residue was purified by column chromatography (silica gel, hexane/ethyl acetate=10/1, volume ratio) to obtain 3.5 g of a colorless liquid (65.3% yield).

By a $^1$H-NMR measurement, it was confirmed that the product was monomer (a1-6).

$^1$H-NMR (CDCl$_3$): δ (ppm): 0.89 (s, 6H), 1.21 (s, 6H), 1.56 (t, 2H), 1.61 (s, 6H), 1.87 (m, 2H), 1.91 (s, 3H), 5.06 (m, 1H), 5.52 (s, 1H), 6.05 (s, 1H), 7.20 (t, 1H), 7.30 (t, 2H), 7.47 (d, 2H)

The structure of the monomer (a1-6) is shown in the following formula (12).

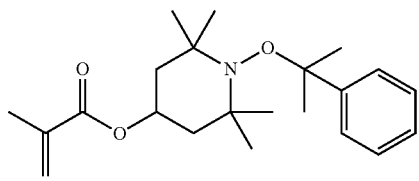

(12)

Production Example 1

Copolymer (b-1) of Monomer (a1-1) with Methyl Methacrylate 17.7 g (50 mmol) of the monomer (a-1), 45.1 g (450 mmol) of methyl methacrylate (MMA), 0.6 g of octyl mercaptan, and 0.3 g of 2,2'-azobisisobutyronitrile were dissolved to 200 ml of toluene, and the polymerization was carried out under nitrogen atmosphere at 75° C. for 4 hours. The polymer solution obtained was reprecipitated with methanol, and vacuum drying was carried out at 85° C. to obtain polymer (b-1). The polymer (b-1) had an Mn of $1.68 \times 10^4$ and a PDI of 1.44, and the yield was 35.7 g (56.9% yield).

Production Example 2

Copolymer (b-2) of Monomer (a1-2) with MMA 12.8 g (50 mmol) of the monomer (a-2), 45.1 g (450 mmol) of MMA, 0.6 g of octyl mercaptan, and 0.3 g of 2,2'-azobisisobutyronitrile were dissolved to 200 ml of toluene, and the polymerization was carried out under nitrogen atmosphere at 75° C. for 4 hours. The polymer solution obtained was reprecipitated with methanol, and vacuum drying was carried out at 85° C. to obtain polymer (b-2). The polymer (b-2) had an Mn of $1.89 \times 10^4$ and a PDI of 1.39, and the yield was 27.7 g (47.9% yield).

Production Example 3

Copolymer (b-3) of Monomer (a1-2) with MMA 7.7 g (30 mmol) of the monomer (a-2), 27.0 g (270 mmol) of MMA, 0.6 g of octyl mercaptan and 0.16 g of 2,2'-azobisisobutyronitrile were dissolved to 100 ml of toluene, and the polymerization was carried out under nitrogen atmosphere at 75° C. for 4 hours. The polymer solution obtained was reprecipitated with methanol, and vacuum drying was carried out at 85° C. to obtain polymer (b-3). The polymer (b-3) had an Mn of $0.83 \times 10^4$ and a PDI of 1.66, and the yield was 22.1 g (63.8% yield).

Production Example 4

Copolymer (b-4) of Monomer (a1-2) with MMA 7.7 g (30 mmol) of the monomer (a-2), 27.0 g (270 mmol) of MMA, 1.5 g of octyl mercaptan and 0.16 g of 2,2'-azobisisobutyronitrile were dissolved to 100 ml of toluene, and the polymerization was carried out under nitrogen atmosphere at 75° C. for 4 hours. The polymer solution obtained was reprecipitated with methanol, and vacuum drying was carried out at 85° C. to obtain polymer (b-4). The polymer (b-4) had an Mn of $0.52 \times 10^4$ and a PDI of 1.42, and the yield was 19.8 g (57.1% yield).

Examples 1 to 3

MMA and monomer (a1) were mixed in a ratio described in Table 1 to obtain a monomer mixture. The content (mol %) of the monomer (a1) in the monomer mixture is shown in Table 1. To the monomer mixture, 0.35 part of t-hexyl peroxy pivalate as a polymerization initiator and 0.015 part of sodium di(2-ethylhexyl)sulfosuccinate as a mold lubricant were added. After this mixture was degassed under a reduced pressure, it was injected into a mold formed with 2 reinforced glass boards which were faced each other at a distance of 1.2 mm through a gasket made from polyvinyl chloride.

The mold was immersed in hot water of 80° C. for 30 minutes to carry out the first polymerization step, and it was heat treated in an air heating oven of 130° C. for 30 minutes to carry out the second polymerization step. After a cooling off to 80° C., the mold form was removed to obtain molded bodies (1) to (3) with a board thickness of 1.0±0.2 mm.

The polymerization conversion ratios, the appearances, and the yellow factors by the weathering test (condition 1) of the molded bodies (1) to (3) are shown in Table 1. Note that, in Example 3, the weathering test is not carried out.

Comparative Examples 1 to 5

Molded bodies (4) to (8) were obtained in the same manner as in Example 1 except that monomer (a1) was not used but HALS shown in Table 1 was used. The polymerization conversion ratios, the appearances, and the yellow factors by the weathering test (condition 1) of the molded bodies (4) to (8) are shown in Table 1.

TABLE 1

| Molded Body | MMA (a2) [part(s)] | Monomer (a1) HALS [part(s)] | | (a1) HALS [mol %] | Polymerization Temperature [° C.] | Conversion Ratio [%] | Appearance (Coloration) | Yellow Factor (Adjusted Value) Weathering Test (Condition 1) | | |
|---|---|---|---|---|---|---|---|---|---|---|
| | | | | | | | | Before Test | After Test | Displacement |
| Ex. 1 | 1 | 100 | a1-1 | 0.35 | 0.10 | 130 | 99.3 | Absence | 0.22 | 1.02 | 0.80 |
| Ex. 2 | 2 | 100 | a1-2 | 0.28 | 0.10 | 130 | 99.2 | Absence | 0.22 | 1.15 | 0.93 |
| Ex. 3 | 3 | 100 | a1-3 | 0.44 | 0.10 | 130 | 99.2 | Absence | 0.24 | — | — |
| Comp. Ex. 1 | 4 | 100 | LA-87 | 0.23 | 0.10 | 130 | 99.3 | Absence | 0.23 | 1.43 | 1.20 |
| Comp. Ex. 2 | 5 | 100 | LA-82 | 0.24 | 0.10 | 130 | 99.3 | Absence | 0.23 | 1.36 | 1.13 |

TABLE 1-continued

|  | Molded Body | MMA (a2) [part(s)] | Monomer (a1) HALS [part(s)] | (a1) HALS [mol %] | Polymerization Temperature [° C.] | Conversion Ratio [%] | Appearance (Coloration) | Yellow Factor (Adjusted Value) Weathering Test (Condition 1) | | |
|---|---|---|---|---|---|---|---|---|---|---|
|  |  |  |  |  |  |  |  | Before Test | After Test | Displacement |
| Comp. Ex. 3 | 6 | 100 | LS770 | 0.24 | 0.05 * | 130 | 99.3 | Absence | 0.21 | 1.47 | 1.26 |
| Comp. Ex. 4 | 7 | 100 | TV-292 | 0.25 | 0.05 * | 130 | 99.3 | Absence | 0.23 | 1.33 | 1.10 |
| Comp. Ex. 5 | 8 | 100 | — | — | — | 130 | 99.3 | Absence | 0.23 | 1.58 | 1.35 |

The abbreviations in Table 1:
LA-87: 2,2,6,6-tetramethyl-4-methacryloyloxypiperidine (made by ADEKA CORPORATION, LA-87)
LA-82: 1,2,2,6,6-pentamethyl-4-methacryloyloxypiperidine (made by ADEKA CORPORATION, LA-82)
LS770: bis(2,2,6,6-tetramethyl-4-piperidyl) sebacate (made by ADEKA CORPORATION, LS770)
TV-292: bis(1,2,2,6,6-pentamethyl-4-piperidyl) sebacate (made by Ciba JAPAN, TV-292)
* Since LS-770 and TV-292 have two hindered amine structures containing a piperidine skeleton (hereinafter, referred to as "HALS site") in the molecule, they are added so that the HALS site is 0.10 mol %.

Examples 4 to 25 and Comparative Examples 6 to 11

Molded bodies (9) to (36) with a board thickness of 3.0±0.2 mm were obtained in the same manner as in Example 1 except that corresponding raw materials shown in Table 2 and Table 3 were used, the distance of the reinforced glass boards were 3.6 mm, and the amount of t-hexyl peroxy pivalate were 0.19 part.

The polymerization conversion ratios, the appearances, and the yellow factors by the weathering test (condition 2) of the molded bodies (9) to (36) are shown in Table 2 and Table 3. Note that, as for the columns of Tg and the weathering test where the result is not shown, the measurement was not carried out.

TABLE 2

|  | Molded Body | PMMA [part(s)] | MMA (a2) [part(s)] | Monomer (a1) HALS [part(s)] | (a1) HALS [mol %] | Polymerization Temperature [° C.] | Conversion Ratio [%] | Appearance (Coloration) | Tg [° C.] | Yellow Factor (Adjusted Value) Weathering Test (Condition 2) | | |
|---|---|---|---|---|---|---|---|---|---|---|---|---|
|  |  |  |  |  |  |  |  |  |  | Before Test | After Test | Displacement |
| Ex. 4 | 9 | 18 | 82 | a1-1 | 0.11 | 0.03 | 130 | 99.8 | Absence | — | 0.22 | 4.57 | 4.35 |
| Ex. 5 | 10 | 18 | 82 | a1-1 | 0.35 | 0.10 | 130 | 98.0 | Absence | — | 0.23 | 3.62 | 3.40 |
| Ex. 6 | 11 | 18 | 81 | a1-1 | 1.1 | 0.30 | 130 | 98.9 | Absence | — | 0.30 | 2.50 | 2.20 |
| Ex. 7 | 12 | 11 | 86 | a1-1 | 3.4 | 1.00 | 130 | 98.1 | Absence | 104.2 | 0.32 | 1.51 | 1.20 |
| Ex. 8 | 13 | 9.4 | 81 | a1-1 | 9.9 | 3.00 | 130 | 98.9 | Absence | — | 0.60 | 1.39 | 0.79 |
| Ex. 9 | 14 | 0.66 | 71 | a1-1 | 28 | 10.00 | 130 | 98.5 | Absence | — | 0.38 | 0.97 | 0.60 |
| Ex. 10 | 15 | 18 | 80 | a1-4 | 1.5 | 0.30 | 130 | 98.9 | Absence | — | 0.24 | 2.80 | 2.56 |
| Ex. 11 | 16 | 18 | 82 | a1-5 | 0.077 | 0.03 | 130 | 98.4 | Absence | — | 0.23 | — | — |
| Ex. 12 | 17 | 18 | 82 | a1-5 | 0.26 | 0.10 | 130 | 98.0 | Absence | — | 0.21 | — | — |
| Ex. 13 | 18 | 18 | 81 | a1-5 | 0.76 | 0.30 | 130 | 99.0 | Absence | — | 0.24 | — | — |
| Ex. 14 | 19 | 18 | 80 | a1-5 | 2.5 | 1.00 | 130 | 98.9 | Absence | 110.7 | 0.22 | — | — |
| Ex. 15 | 20 | 17 | 76 | a1-5 | 7.3 | 3.00 | 130 | 98.9 | Absence | — | 0.41 | 4.15 | 3.74 |
| Ex. 16 | 21 | 14 | 64 | a1-5 | 22 | 10.00 | 130 | 98.5 | Absence | — | 0.46 | 3.96 | 3.50 |
| Ex. 17 | 22 | 4.2 | 44 | a1-5 | 52 | 30.00 | 130 | 97.7 | Absence | — | 0.62 | 2.04 | 1.43 |
| Comp. Ex. 6 | 23 | 18 | 82 | a1-6 | 0.36 | 0.10 | 130 | 77.0 | Presence | — | 7.03 | — | — |
| Comp. Ex. 7 | 24 | 18 | 82 | TV-123 | 0.37 | 0.05 * | 130 | 99.0 | Absence | — | 0.29 | 4.15 | 3.86 |
| Comp. Ex. 8 | 25 | 18 | 81 | TV-123 | 1.1 | 0.15 * | 130 | 96.6 | Absence | — | 0.51 | 3.01 | 2.49 |
| Comp. Ex. 9 | 26 | 18 | 78 | TV-123 | 3.7 | 0.50 * | 130 | 94.2 | Presence ** | 77.5 | 3.22 | — | — |
| Comp. Ex. 10 | 27 | 18 | 81 | TV-152 | 1.1 | 0.15 * | 130 | 91.2 | Absence | — | 0.69 | 4.91 | 4.23 |
| Comp. Ex. 11 | 28 | 18 | 82 | — | — | — | 130 | 98.9 | Absence | 111.9 | 0.25 | 5.32 | 5.07 |

TABLE 3

|  | Molded Body | PMMA [part(s)] | MMA (a2) [part(s)] | Monomer (a1) [part(s)] | (a1) [mol %] | TV-P [part(s)] | Polymerization Temperature [° C.] | Conversion Ratio [%] | Appearance (Coloration) | Yellow Factor (Adjusted Value) (Condition 2) | | |
|---|---|---|---|---|---|---|---|---|---|---|---|---|
|  |  |  |  |  |  |  |  |  |  | Before Test | After Test | Displacement |
| Ex. 18 | 29 | 18 | 82 | a1-1 | 0.11 | 0.03 | 0.01 | 130 | 98.8 | Absence | 0.26 | 3.42 | 3.16 |
| Ex. 19 | 30 | 18 | 82 | a1-1 | 0.35 | 0.10 | 0.01 | 130 | 99.0 | Absence | 0.30 | 2.99 | 2.68 |
| Ex. 20 | 31 | 18 | 81 | a1-1 | 1.1 | 0.30 | 0.01 | 130 | 99.0 | Absence | 0.52 | 2.27 | 1.75 |
| Ex. 21 | 32 | 17 | 80 | a1-1 | 3.4 | 1.00 | 0.01 | 130 | 99.1 | Absence | 0.52 | 1.63 | 1.11 |
| Ex. 22 | 33 | 18 | 82 | a1-5 | 0.077 | 0.03 | 0.01 | 130 | 98.3 | Absence | 0.27 | — | — |
| Ex. 23 | 34 | 18 | 82 | a1-5 | 0.26 | 0.10 | 0.01 | 130 | 98.7 | Absence | 0.30 | — | — |

TABLE 3-continued

| | Molded Body | PMMA [part(s)] | MMA (a2) [part(s)] | Monomer (a1) [part(s)] | (a1) [mol %] | TV-P [part(s)] | Polymerization Temperature [°C.] | Conversion Ratio [%] | Appearance (Coloration) | Yellow Factor (Adjusted Value) (Condition 2) Before Test | After Test | Dis-placement |
|---|---|---|---|---|---|---|---|---|---|---|---|---|
| Ex. 24 | 35 | 18 | 81 | a1-5 | 0.76 | 0.30 | 0.01 | 130 | 98.7 | Absence | 0.23 | — | — |
| Ex. 25 | 36 | 18 | 79 | a1-5 | 2.5 | 1.00 | 0.01 | 130 | 99.5 | Absence | 0.26 | — | — |

The abbreviations in Table 2 and Table 3:
PMMA: MMA polymer (made by Mitsubishi Rayon Co., Ltd., VHK000)
TV-123: bis(1-octyloxy-2,2,6,6-pentamethyl-4-piperidyl) sebacate (made by Ciba JAPAN, TV-123)
TV-152: 2,4-bis[N-butyl-N-(1-cyclohexyloxy-2,2,6,6-tetramethylpiperidine-4-yl)amino]-6-(2-hydroxyethylamine)-1,3,5-triazine (made by Ciba JAPAN, TV-152)
TV-P: 2-(2'-hydroxy-5'-methylphenyl)benzotriazole (made by Ciba JAPAN, TV-P)
* Since TV-123 and TV-152 have two HALS sites in the molecule, the mol number of the HALS site comes to be twice the added mol number.
** In the molded body 26, cloudiness was seen in addition to coloration (Comparative Example 9).

Examples 26 to 29 and Comparative Examples 12 to 18

Molded bodies were obtained in the same manner as in Example 4 except that corresponding raw materials shown in Table 4 were used, and the temperature of the second polymerization step was changed from 130° C.×30 minutes to the polymerization temperature described in Table 4×30 minutes.

The transmission spectra of the molded bodies obtained were measured by spectrophotometer MCPD-3000 (made by Otsuka electronics Co., Ltd., trade name), and the yellow factors were measured. The measured values were adjusted by the sample thickness according to the following expression.

yellow factor (adjusted value)=yellow factor (measured value)×3/board thickness (mm)

The appearances and the yellow factors of the molded bodies are shown in Table 4.

Reference Examples 1 to 3

Corresponding raw materials shown in Table 4 were mixed to obtain a mixture. To the mixture, 0.35 part of t-hexyl peroxy pivalate was added as a polymerization initiator. This was supplied to a glass container and was degassed under a reduced pressure. After that, replacement by nitrogen inside the container was carried out and it was heated to 80° C. for 2 hours to carry out a polymerization. After the polymer obtained was appropriately cut, it was supplied to a small injection molding machine CS-183-MMX (made by Custom Scientific Instruments.INC.) and was kept at a cylinder temperature of 260° C. for 10 minutes. After that, using a mold of 10 mm×20 mm×2 mm, injection molding was carried out at a mold temperature of 60° C. to produce a molded body.

The transmission spectra of the molded bodies obtained were measured in the same manner as in Example 26 to evaluate the yellow factors (adjusted values). In Reference Examples 1 to 3, the yellow factors of the molded bodies in the case in which the board thickness is 3 mm were evaluated by adjustment.

The appearances and the yellow factors of the molded bodies by injection molding are shown in Table 4.

TABLE 4

| | Molded Body | PMMA [part(s)] | MMA (a2) [part(s)] | Monomer (a1) HALS [part(s)] | (a1) HALS [mol %] | Polymerization Temperature [°C.] | Appearance (Coloration) | Yellow Factor (Adjusted Value) Before Test |
|---|---|---|---|---|---|---|---|---|
| Ex. 6 | 11 | 18 | 81 | a1-1 | 1.1 | 0.30 | 130 | Absence | 0.30 |
| Ex. 26 | 37 | 18 | 81 | a1-1 | 1.1 | 0.30 | 160 | Absence | 0.33 |
| Ex. 27 | 38 | 18 | 81 | a1-1 | 1.1 | 0.30 | 200 | Absence | 1.16 |
| Comp. Ex. 12 | 39 | 18 | 81 | a1-1 | 1.1 | 0.30 | 230 | Presence | 23.03 |
| Ref. Ex. 1 | 40 | 18 | 81 | a1-1 | 1.1 | 0.30 | Injection Molding 260 | Presence | 30.32 |
| Ex. 13 | 18 | 18 | 81 | a1-5 | 0.76 | 0.30 | 130 | Absence | 0.24 |
| Ex. 28 | 41 | 18 | 81 | a1-5 | 0.76 | 0.30 | 160 | Absence | 0.26 |
| Ex. 29 | 42 | 18 | 81 | a1-5 | 0.76 | 0.30 | 200 | Absence | 0.39 |
| Ref. Ex. 2 | 43 | 18 | 81 | a1-5 | 0.76 | 0.30 | Injection Molding 260 | Presence | 6.99 |
| Comp. Ex. 8 | 25 | 18 | 81 | TV-123 | 1.1 | 0.15 * | 130 | Absence | 0.51 |
| Comp. Ex. 13 | 44 | 18 | 81 | TV-123 | 1.1 | 0.15 * | 160 | Absence | 0.54 |
| Comp. Ex. 14 | 45 | 18 | 81 | TV-123 | 1.1 | 0.15 * | 200 | Absence | 2.08 |
| Comp. Ex. 15 | 46 | 18 | 81 | TV-123 | 1.1 | 0.15 * | 230 | Presence | 38.89 |
| Comp. Ex. 11 | 28 | 18 | 82 | — | — | — | 130 | Absence | 0.25 |
| Comp. Ex. 16 | 47 | 18 | 82 | — | — | — | 160 | Absence | 0.23 |

TABLE 4-continued

|  | Molded Body | PMMA [part(s)] | MMA (a2) [part(s)] | Monomer (a1) HALS [part(s)] | (a1) HALS [mol %] | Polymerization Temperature [° C.] | Appearance (Coloration) | Yellow Factor (Adjusted Value) Before Test |
|---|---|---|---|---|---|---|---|---|
| Comp. Ex. 17 | 48 | 18 | 82 | — | — — | 200 | Absence | 0.31 |
| Comp. Ex. 18 | 49 | 18 | 82 | — | — — | 230 | Absence | 0.63 |
| Ref. Ex. 3 | 50 | 18 | 82 | — | — — | Injection Molding 260 | Absence | 1.25 |

The abbreviations in Table 4:
PMMA: MMA polymer (made by Mitsubishi Rayon Co., Ltd., VHK000)
TV-123: bis(1-octyloxy-2,2,6,6-pentamethyl-4-piperidyl) sebacate (made by Ciba JAPAN, TV-123)
* Since TV-123 has two HALS sites in the molecule, it is added so that the HALS site is 0.30 mol %.

Examples 30 to 37

Molded bodies (51) to (58) with a board thickness of 3.0±0.2 mm were obtained in the same manner as in Example 4 except that corresponding raw materials shown in Table 5 were used.

The transmission spectra of the molded bodies obtained were measured in the same manner as in Example 26 to evaluate the yellow factors (adjusted values).

The polymerization conversion ratios, the appearances and the yellow factors of the molded bodies (51) to (58) are shown in Table 5.

TABLE 5

|  | Molded Body | PMMA [part(s)] | MMA (a2) [part(s)] | Polymer [part(s)] | (a1) [mol %] | Polymerization Temperature [° C.] | Conversion Ratio [%] | Appearance (Coloration) | Yellow Factor (Adjusted Value) Before Test |
|---|---|---|---|---|---|---|---|---|---|
| Ex. 30 | 51 | 16 | 81 | b-1 3.4 | 0.30 | 130 | 99.3 | Absence | 0.24 |
| Ex. 31 | 52 | 11 | 78 | b-1 11 | 1.00 | 130 | 99.4 | Absence | 0.36 |
| Ex. 32 | 53 | 16 | 80 | b-2 3.7 | 0.30 | 130 | 99.0 | Absence | 0.41 |
| Ex. 33 | 54 | 11 | 77 | b-2 12 | 1.00 | 130 | 98.8 | Absence | 0.59 |
| Ex. 34 | 55 | 16 | 81 | b-3 3.4 | 0.30 | 130 | 99.1 | Absence | 0.23 |
| Ex. 35 | 56 | 11 | 78 | b-3 11 | 1.00 | 130 | 99.0 | Absence | 0.27 |
| Ex. 36 | 57 | 16 | 81 | b-4 3.4 | 0.30 | 130 | 99.0 | Absence | 0.31 |
| Ex. 37 | 58 | 11 | 78 | b-4 11 | 1.00 | 130 | 99.1 | Absence | 0.32 |

The abbreviations in Table 5:
PMMA: MMA polymer (made by Mitsubishi Rayon Co., Ltd., VHK000)

As is clear from Tables 1 to 5, the molded bodies obtained by the production method of the present invention had a low yellow factor and the appearance thereof was good. On the other hand, among the molded bodies obtained by the polymerization at the temperature of higher than 210° C., the molded body obtained by using monomer (a1) had a high yellow factor and the appearance thereof was inferior (Comparative Example 12). Among the molded bodies obtained by injection molding at the temperature of higher than 210° C., the molded body obtained by using monomer (a1) had a high yellow factor and the appearance thereof was no good (Reference Examples 1 and 2). The molded body obtained by using monomer (a1-6), which has a different structure from monomer (a1) of the present invention, had a high yellow factor and the appearance thereof was no good even if the polymerization temperature was 130° C. (Comparative Example 6).

As is clear from Tables 1 to 3, the molded bodies obtained by the production method of the present invention had a small displacement of the yellow factor before and after the weathering test and showed a good weathering resistance. On the other hand, the molded body obtained by not using monomer (a1) had a large displacement of the yellow factor before and after the weathering test and showed an inferior weathering resistance (Comparative Examples 1 to 5, 7, 8, 10, and 11).

As is clear from Table 2, the molded bodies (Comparative Examples 7, 8, and 10) obtained by using TV-123 or TV152 that is a non-polymerizable NOR-HALS had a large displacement of the yellow factor before and after the weathering test and showed an inferior weathering resistance, in comparison with the molded bodies (Examples 5 and 6) containing the equal mol amount of the HALS site among the molded bodies obtained by using monomer (a1) that is a polymerizable NOR-HALS.

As is clear from Table 2, the molded bodies (Examples 7 and 14) obtained by the production method of the present invention had a small decrease of Tg and a good weathering resistance, in comparison with the molded body (Comparative Example 9) containing TV123 that is a non-polymerizable NOR-HALS.

Industrial Applicability

The production method of the present invention enables a production of a molded body which has an excellent weathering resistance and in which the advantageous effect does not decrease with time, without occurrence of coloration by decomposition of a polymerizable NOR-HALS. The molded body produced by the present invention is useful for an article using outside such as a building material and specifically for a top cover for a solar power module.

What is claimed is:
1. A method for producing a polymer, the method comprising:
polymerizing, at a temperature of 210° C. or lower, a mixture comprising:
a monomer (a1), and
a monomer component (a2) comprising at least 50 wt % of methyl methacrylate, to obtain a first polymer; and then, polymerizing, at a temperature of 210° C. or lower, a second mixture comprising the first polymer and a further monomer component (a2') comprising at least 50 wt % of methyl methacrylate, wherein the second mixture comprises from 0.01 to 35 mol % of the monomer (a1), which has formula (1):

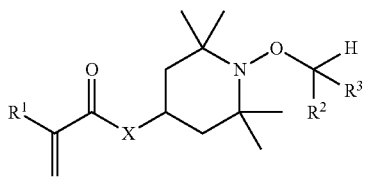

(1)

wherein, $R^1$ is a hydrogen atom or a methyl group,

X is an oxygen atom, an imino group, a group having formula (2), or a group having formula (3):

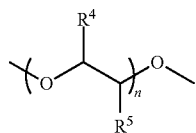

(2)

wherein, in formula (2), n is an integer of 1 to 10, and $R^4$ and $R^5$ are each independently a hydrogen atom or a methyl group, with the proviso that at least one of $R^4$ and $R^5$ is a hydrogen atom,

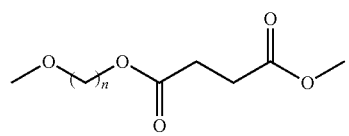

(3)

wherein, in formula (3), n is an integer of 1 to 10, $R^2$ and $R^3$ are each independently a hydrogen atom, a linear alkyl group with a carbon number of 1 to 8, a branched alkyl group with a carbon number of 1 to 8, an optionally substituted alicyclic hydrocarbon with a carbon number of 6 to 8, or $R^2$ and $R^3$ together form an optionally substituted cyclic structure.

2. The method of claim 1, wherein the polymerization of the mixture is cast polymerization.

3. The method of claim 1, wherein, in formula (1), $R^1$ is a hydrogen atom.

4. A method for producing a polymer, the method comprising:

polymerizing at a temperature of 210° C. or lower, a monomer mixture comprising:

from 0.01 to 35 mol % of a monomer (a1) of formula (1); and from 65 to 99.99 mol % of a monomer component (a2) comprising 50 wt % or more of methyl methacrylate, wherein the monomer (a1) has formula (1):

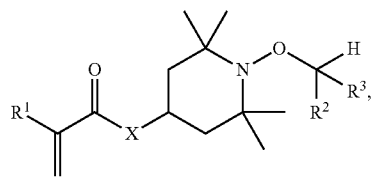

(1)

wherein, in formula (1):
$R^1$ is a hydrogen atom or a methyl group;
X is a group having formula (2):

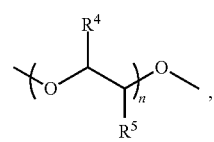

(2)

wherein, in formula (2):
n is an integer of 1 to 10; and
$R^4$ and $R^5$ are each independently a hydrogen atom or a methyl group, with the proviso that at least one of $R^4$ and $R^5$ is a hydrogen atom; and
$R^2$ and $R^3$ are each independently a hydrogen atom, a linear alkyl group with a carbon number of 1 to 8, a branched alkyl group with a carbon number of 1 to 8, an optionally substituted alicyclic hydrocarbon with a carbon number of 6 to 8, or $R^2$ and $R^3$ together form an optionally substituted cyclic structure.

5. A method for producing a polymer, the method comprising:

polymerizing at a temperature of 210° C. or lower, a monomer mixture comprising:

from 0.01 to 35 mol % of a monomer (a1) of formula (1); and from 65 to 99.99 mol % of a monomer component (a2) comprising 50 wt % or more of methyl methacrylate, wherein the monomer (a1) has formula (1):

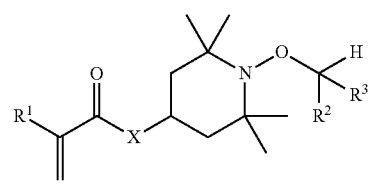

(1)

wherein, in formula (1):
$R^1$ is a hydrogen atom or a methyl group;
X is a group having formula (3):

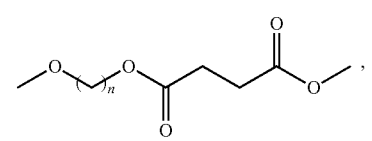

(3)

wherein n is an integer of 1 to 10; and
$R^2$ and $R^3$ are each independently a hydrogen atom, a linear alkyl group with a carbon number of 1 to 8, a branched alkyl group with a carbon number of 1 to 8, an optionally substituted alicyclic hydrocarbon with a carbon number of 6 to 8, or $R^2$ and $R^3$ together form an optionally substituted cyclic structure.

* * * * *